United States Patent Office 3,452,067
Patented June 24, 1969

3,452,067
DIRECT PRODUCTION OF ESTERS
FROM ALCOHOLS
Lloyd A. Pine, Baton Rouge, La., assignor to Esso Research and Engineering Company, a corporation of Delaware
No Drawing. Filed May 27, 1966, Ser. No. 553,293
Int. Cl. C11c 3/02; C07c 67/00, 69/02
U.S. Cl. 260—410.9
7 Claims

ABSTRACT OF THE DISCLOSURE

A process for the preparation of esters by catalytic dehydrogenation and disproportionation of alcohols, in vapor phase, in the presence of molybdenum sulfide catalysts. Esters containing twice the number of carbon atoms as the original alcohol from which the esters are prepared are obtained by contacting such alcohols, in vapor phase reactions at from 400–600° F., over supported molybdenum sulfide catalysts, e.g., molybdenum sulfide.

This invention relates to the preparation of esters. More particularly, this invention relates to a one-step process for preparing esters from primary alcohols over a molybdenum containing catalyst.

The preparation of esters from alcohols normally involves a two-step process: first, oxidation of the alcohol to an acid; and second, reaction of the acid with an alcohol to form the desired ester. If the acid, acid chloride, or acid anhydride are available, the alcohol can be directly reacted with one of these reactants, preferably in the presence of an acid catalyst to form the ester. However, the acid or its chloride or anhydride are generally more expensive than the alcohols, and in any case requires an additional reactant. It is also known to prepare esters in one-step processes, such as set forth in U.S. Patent No. 2,522,676: reaction of normal alcohols, in the liquid phase at temperatures above 500° F., with sulfur. Such a reaction, however, is characterized by the disadvantageous formation of side products such as hydrogen sulfide and considerable amounts of mercaptans. One-step reactions which do not require more than one reactant are also disclosed in U.S. Patent Nos. 1,708,460 and 2,145,097. The processes taught in these patents suffered from the disadvantages of low yield and high pressure requirements in the former and the difficulty of handling copper chromite catalysts in the latter.

Lower molecular weight esters are particularly useful as solvents for lacquers, cosmetics, and the like. Higher molecular weight esters are particularly useful as special purpose lubricants or as intermediates in the preparation of elastomers and synthetic fibers.

In accordance with the inventive concept embodied herein, esters may be prepared in a one-step process directly from saturated primary alcohols or mixtures thereof by passing the alcohol over a molybdenum containing catalyst, the reaction taking place in the vapor phase. Not wishing to be bound by any particular theory, it is believed that the mechanism by which the ester is formed involves a combination of dehydrogenation and disproportionation. The alcohol is initially dehydrogenated to its corresponding aldehyde which is immediately followed by disproportionation and condensation to form the ester. Thus, where the initial reactant is ethyl alcohol, ethyl acetate will form with acetaldehyde as an intermediate product. The overall reaction sequence may be illustrated by the following expression, when individual alcohol feedstocks are used:

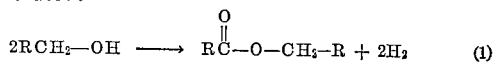

the resulting ester having twice the number of carbon atoms as the starting alcohol. When mixtures of primary alcohols are employed, esters will be formed according to the following expression:

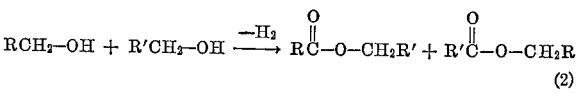

in addition to ester formation involving 2 moles of R and ester formation involving 2 moles of R'. Thus, this process is useful for the direct synthesis of esters from alcohols, where the ester desired corresponds to the ester of a primary alcohol and the acid corresponding to the oxidation product of the same or a different primary alcohol.

The catalyst employed in this invention is suitably a molybdenum containing catalyst. Such catalysts may be illustrated by molybdenum sulfide, molybdenum oxide, sulfided cobalt molybdate, molybdenum blue ($MoO_3$), and the like. These catalysts are quite stable and can be used for long periods of time without apparent loss of either activity or selectivity to ester formation.

The catalysts may, of course, be supported on inert carriers of any of the readily available types. Carriers that may be utilized are the various aluminous and silicious materials of natural or synthetic origin, such as: bauxite, alumina, activated alumina, kieselguhr, magnesium oxide, magnesium silicate, magnesium carbonate, barium sulfate, pumice, kaolin, activated carbon, clays, Carborundum, Alundum, and the like. The nonacidic or weakly acidic carriers are preferred, and activated carbon is particularly preferred. The catalysts preferably contain about 1–25 wt. percent of the active material, more preferably 1–15 wt. pecent, still more preferably 1–10 wt. percent, supported on a carrier of the type described, e.g. activated carbon. A particularly preferred molybdenum containing catalyst is a sulfided molybdenum suitably supported, and preferably supported on activated carbon. This catalyst may be conveniently prepared by impregnating activated carbon pellets with a hexavalent molybdenum salt, e.g. ammonium molybdate. The mixture is then heated to convert the molybdenum salt to its corresponding oxide, e.g. $MoO_3$. The oxide is then sulfided by heating with $H_2S$. The catalyst prepared in this manner usually contains some elemental sulfur formed in the sulfiding stage which is removed in the initial stages of ester production. A preferred method for preparing the catalyst, which produces little or no free sulfur on the catalyst, employs reduction of the hexavalent molybdenum salt prior to sulfiding. The molybdenum salt is heated, after impregnation, to about 200 to 350° F., thereby decomposing the molybdate to $MoO_3$. Thereafter, a stream of hydrogen is introduced at about 600 to 1000° F. and 200 to 3000 p.s.i.g., for a sufficient period of time to reduce the $MoO_3$ to $MoO_2$ or MoO, or a mixture of the lower oxides. The sulfided catalyst, whether prepared from the higher or lower oxides of molybdenum, consists mainly of $MoS_2$, i.e. the molybdenum is mostly in the quadrivalent state. However, when the molybdenum is reduced to the quadrivalent state, or lower, prior to sulfiding, oxidation of the $H_2S$ to elemental sulfur is avoided.

In general, the process of this invention is applicable to aliphatic, saturated, primary alcohols and mixtures thereof. More specifically, these alcohols contain from 2 to about 15 carbon atoms, preferably 2 to 12 carbon atoms, and more preferably 2 to 8 carbon atoms. The alcohols may be straight chain or branched. It is desirable to employ monohydric alcohols since alcohols containing more than one hydroxyl group lack product selectivity in the present invention. Illustrative of the alcohols which may be employed as feedstocks in this process are: ethyl alcohol, n-propyl alcohol, n- and isobutyl, pentyl, hexyl, heptyl, octyl, nonyl and decyl alcohols and the like, as well as mixtures of two or more of the foregoing.

Reaction conditions are not critical so long as the process is conducted in the vapor phase. (Liquid phase reactions do not favor dehydrogenation and lead to a product mixture containing aldol condensation products rather than esters.) Therefore, reaction temperatures will increase with increasing number of carbon atoms in the alcohol to be reacted. Normally, however, reaction temperatures are preferably in the range of about 400–600° F., and more preferably 450–550° F. Temperatures below about 400° F. are less desirable since alcohol conversion is low, while temperatures above 600° F. are also less desirable because of alcohol loss due to dehydration. Pressure may also vary widely, i.e. from about 0.5 to 100 p.s.i.a., preferably 0.5 to 50 p.s.i.a., more preferably at atmospheric pressure.

The process of this invention is equally applicable to batch and continuous reactions, preferably continuous reactions. In a continuous reaction the flow rate may range widely, 0.05 to 2.0 w./hr./w., preferably 0.10 to 1.0 w./hr./w. (w./hr./w. is weight feed per hour per weight catalyst).

This invention will be more completely described by reference to the following examples. No limitations other than those incorporated into the appended claims are to be implied from these illustrative examples.

In all of the examples cited, 65 cc. of 14–40 mesh catalyst was used. The reactor was a Vycor tube heated by a fluidized sandbath. All runs were downflow and at atmospheric pressure. The liquid products were caught in a wet ice trap for analysis by gas chromatography (G.C.). Results reported in the tables are based on the uncorrected areas of the peaks in the gas chromatograms of the liquid products. The identities of the different compounds in the liquid products were established by trapping the individual components that were separated by the G.C. and taking infrared spectra. The gaseous product from the reactor was not analyzed. Table I illustrates ester formation from several different alcohols, while Table II illustrates the effect of temperature on ethyl alcohol conversion to ethyl acetate. In all cases catalysts contained about 10 wt. percent molybdenum sulfide on charcoal.

TABLE I.—ALCOHOL CONVERSION OVER MOLYBDENUM SULFIDE/CARBON CATALYST

[550° F., 11.0 cc/hr.]

| Feed alcohol | Products, area percent by G.C. | | | | | |
|---|---|---|---|---|---|---|
| | Light ends | Aldehyde | Ether | Alcohol | Ester | Acid |
| n-Propyl | 2.5 | 13.6 | 1.0 | 60.1 | 22.2 | 0.6 |
| n-Butyl | 6.0 | 16.5 | 1.8 | 52.3 | 22.9 | 0.6 |
| Isobutyl | 5.6 | 15.6 | 0.4 | 65.6 | 12.4 | 0.4 |

TABLE II.—ETHYL ALCOHOL OVER MOLYBDENUM SULFIDE/CARBON CATALYST

| Temp., ° F. | Feed rate, ml., hr. | Products, area percent by G.C. | | | | |
|---|---|---|---|---|---|---|
| | | Light ends | $CH_3CHO$ | ETOAc | ETOH | HOAc |
| 400 | 11 | 1.9 | 1.0 | 3.9 | 93.2 | 0.0 |
| 450 | 11 | 1.5 | 1.8 | 8.1 | 88.6 | 0.0 |
| | 21 | 0.6 | 1.1 | 4.6 | 93.7 | 0.0 |
| 500 | 11 | 1.6 | 4.3 | 18.6 | 75.5 | 0.0 |
| | 21 | 2.3 | 5.0 | 12.2 | 80.6 | 0.0 |
| | 31 | 1.5 | 3.5 | 6.9 | 88.1 | 0.0 |
| 550 | 11 | 1.5 | 12.4 | 32.8 | 51.9 | .1 |
| | 21 | 1.8 | 9.4 | 20.4 | 68.4 | Trace |
| | 31 | 1.1 | 7.8 | 11.6 | 79.5 | 0.0 |
| 600 | 11 | 0.4 | 13.3 | 41.4 | 30.8 | 14.1 |
| | 21 | 0.6 | 16.0 | 31.1 | 47.8 | 4.5 |
| | 31 | 0.5 | 15.0 | 24.3 | 59.1 | 1.0 |

Since some of the compounds found in the product, i.e. unreacted alcohol, aldehyde, and acid, are precursors of the ester, these may be separated by distillation and recycled to the reactor. In this manner, up to 100% conversion of the initial alcohol reactant may be obtained.

What is claimed is:
1. A process for the preparation of an ester from a saturated, primary aliphatic alcohol containing from about 2–15 carbon atoms comprising reacting the said alcohol, in vapor phase, over a molybdenum sulfide catalyst.
2. The process of claim 1 wherein the alcohols contain about 2–12 carbon atoms.
3. The process of claim 1 wherein the reaction temperature is about 400–600° F.
4. The process of claim 1 wherein the process is carried out continuously at flow rates of about 0.05 to 2.0 w./hr./w.
5. The process of claim 1 wherein the esters are recovered from the reaction product and the ester precursors are recycled.
6. The process of claim 1 wherein the catalyst is selected from the group consisting of molybdenum sulfide and sulfided cobalt molybdate.
7. The process of claim 6 wherein the catalyst is supported on activated carbon.

References Cited

UNITED STATES PATENTS 1,708,460   4/1929   Zeisberg _____ 260—495

FOREIGN PATENTS 313,575   12/1930   Great Britain.

LORRAINE A. WEINBERGER, *Primary Examiner.*

JAMES H. NIELSEN, *Assistant Examiner.*

U.S. Cl. X.R.

260—495